United States Patent [19]
Oberdank

[11] 3,847,576
[45] Nov. 12, 1974

[54] STREET SWEEPER FILTER SHAKER SYSTEM

[75] Inventor: Jack O. Oberdank, Corona, Calif.

[73] Assignee: Wayne Manufacturing Company, Pomona, Calif.

[22] Filed: Mar. 27, 1972

[21] Appl. No.: 238,417

[52] U.S. Cl.................. 55/283, 15/340, 55/300, 55/304, 55/432
[51] Int. Cl............................................ B01d 46/04
[58] Field of Search............. 55/283, 291, 299–305, 55/341, 432, 340

[56] References Cited
UNITED STATES PATENTS

| 2,583,881 | 1/1952 | Rasmussen | 55/304 |
| 3,343,342 | 9/1967 | Du Rocher | 55/299 |
| 3,395,519 | 8/1968 | Kleissler | 55/304 |
| 3,512,206 | 5/1970 | Young | 15/340 |
| 3,587,213 | 6/1971 | Tammy | 55/304 |
| 3,636,680 | 1/1972 | Seidel | 55/304 |
| 3,639,940 | 2/1972 | Carlson et al. | 55/304 |
| 3,691,579 | 9/1972 | Kasper | 15/340 |

Primary Examiner—Bernard Nozick
Attorney, Agent, or Firm—C. E. Tripp

[57] ABSTRACT

Street sweeper filter structure is subjected to jarring by force transmission via a manifold supporting the filter, to assure dislodgement of dirt accumulations.

5 Claims, 4 Drawing Figures

STREET SWEEPER FILTER SHAKER SYSTEM

BACKGROUND OF THE INVENTION

This invention relates to cleaning of filters used in street sweepers, and more particularly concerns a method of automatically shaking the filter structure, with jarring, to assure dislodgement of dirt accumulations.

Such accumulations require removal from time to time for maintenance of filter effectiveness and efficiency. In the past, such removal has been variously undertaken by such expedients as air flow reversal and mechanical manipulation of the filter. Also, shakers have operated directly upon filters; however, when the filters are carried by a rigidly mounted manifold, the filter shaking capacity is undesirably limited.

SUMMARY OF THE INVENTION

It is a major object of the invention to provide a solution to the above problem, and characterized by efficiency of dirt removal as a result of jarring force transmission to the filters, as via the manifold. Basically means is provided to support the filter structure for movement along a predetermined path and relative to the dirt chamber containing the filter structure; drive means operable to effect repeated movement of the filter structure along that path; and, means to develop jarring force in response to such structure movement for repeatedly shaking the filter structure, to loosen dirt accumulation. As will be seen, the support means may define an axis about which the filter structure is angularly reciprocated by the drive means, as via the manifold which normally conducts air passing through multiple filter of the filter structure. Such connection of multiple filters to a manifold is described for example in U.S. Pat. No. 3,587,213.

Further, the drive means may comprise an eccentric mass rotatably driven about another axis spaced from the support axis referred to; and the jarring means may comprise a rigid arm carried by the manifold, there being stops located in the path of arm angular reciprocation with the manifold to receive arm impact and thereby limit arm, manifold and filter angular reciprocation. Also, drive of the mass may be caused to occur only when a sweeper hopper door is closed, as will be seen.

These and other objects and advantages of the invention, as well as the details of an illustrative embodiment, will be more fully understood from the following description and drawings, in which:

DRAWING DESCRIPTION

DETAILED DESCRIPTION

Figure 1:
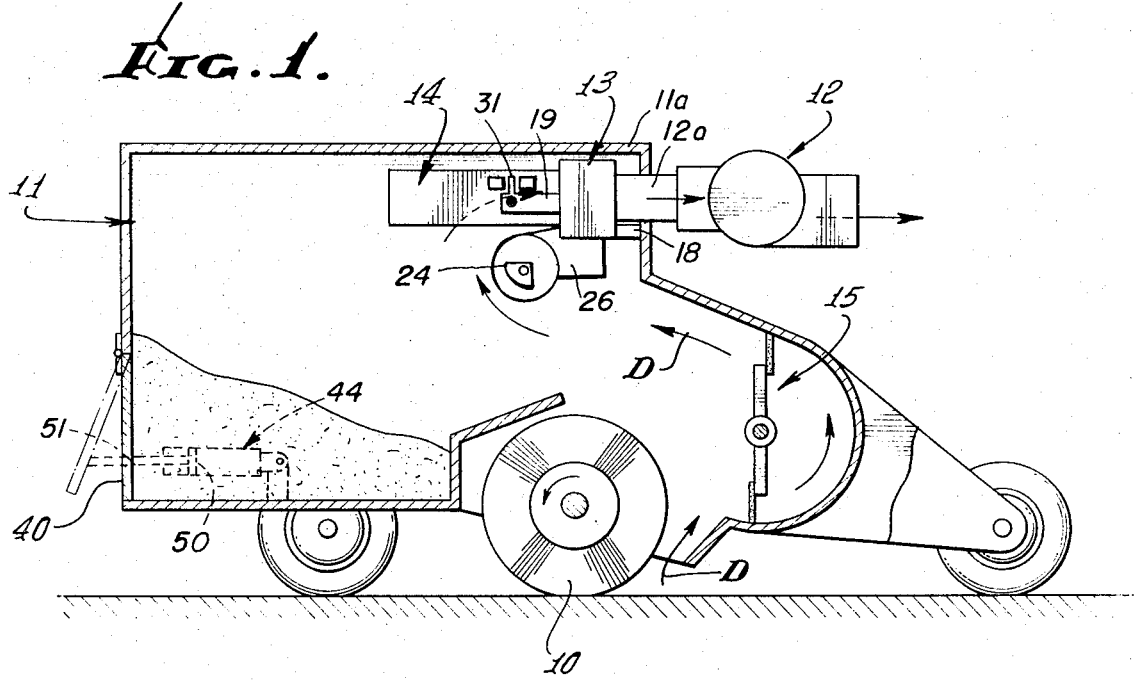
FIG. 1 is a side elevation illustrating a sweeper vehicle embodying the invention.
Figure 4:
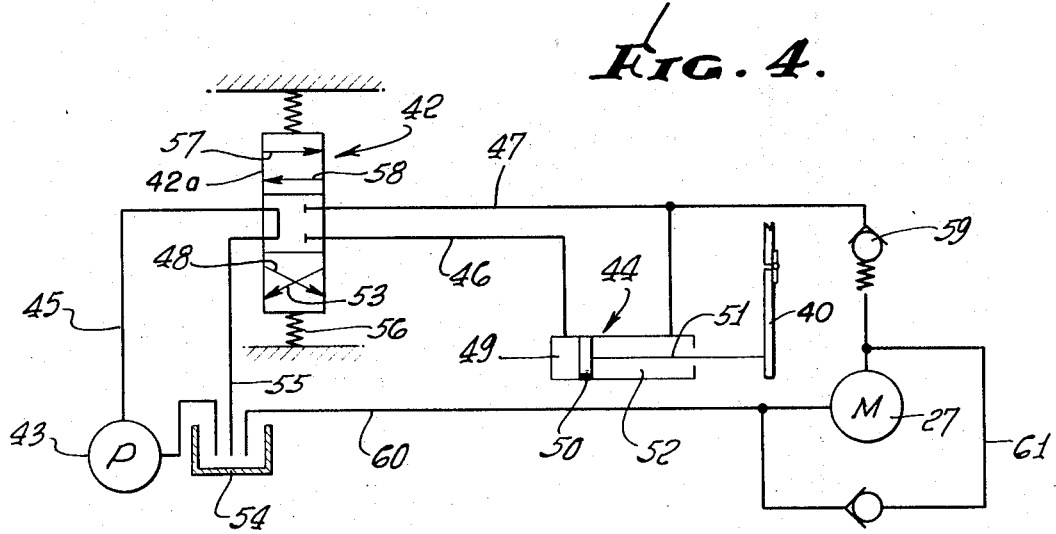
FIG. 4 is an hydraulic system diagram.

In reference to the general showing of FIG. 1, the invention is applicable to the typical powered sweeper there illustrated and in which debris D is swept by rotating brush 10 (and aided by rotary elevator 15) into a hopper or chamber 11 associated with a suction blower 12 operating to induce air flow through a flexible conduit 12a as shown in FIG. 4 of the aforesaid U.S. Pat. No. 3,587,213 and through manifold 13 and an assembly of filter cells 14 for dust separation from the air upstream from the blower. Thus, dust tends to deposit and accumulate on the filter surfaces and it becomes necessary from time to time to remove such accumulations.

As previously indicated, the filter structure or assembly 14, or the individual filter units, may have any of various specific forms and constructions although the invention particularly contemplates an assemblage of cellular filter elements capable of cantilevered support or suspension from the manifold 13 to gain important advantages in relationships between the cell assembly and the shaker mechanism. One example of such filter and manifold structure is found in U.S. Pat. No. 3,587,213.

Figure 2:
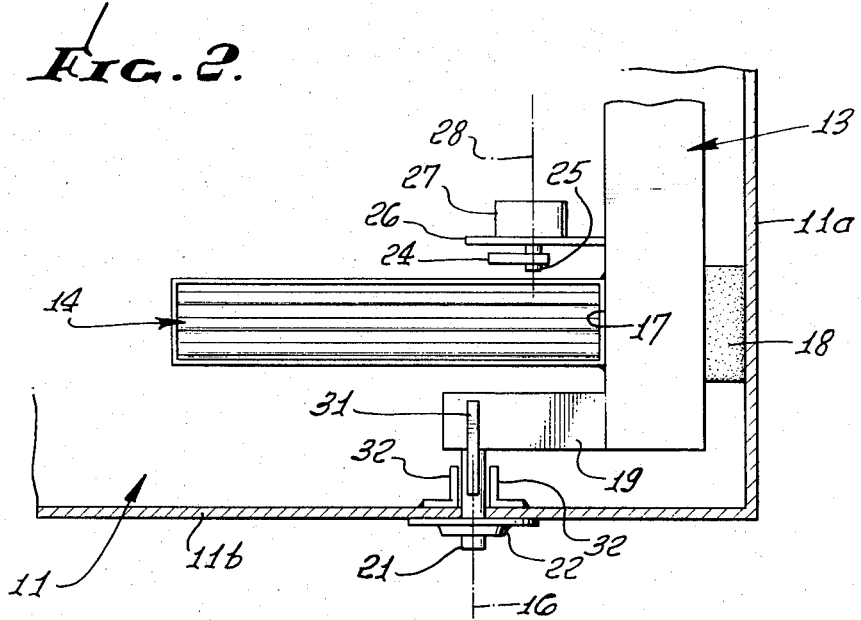
FIG. 2 is an enlarged fragmentary plan view showing details of the filter shaking mechanism.
Figure 3:
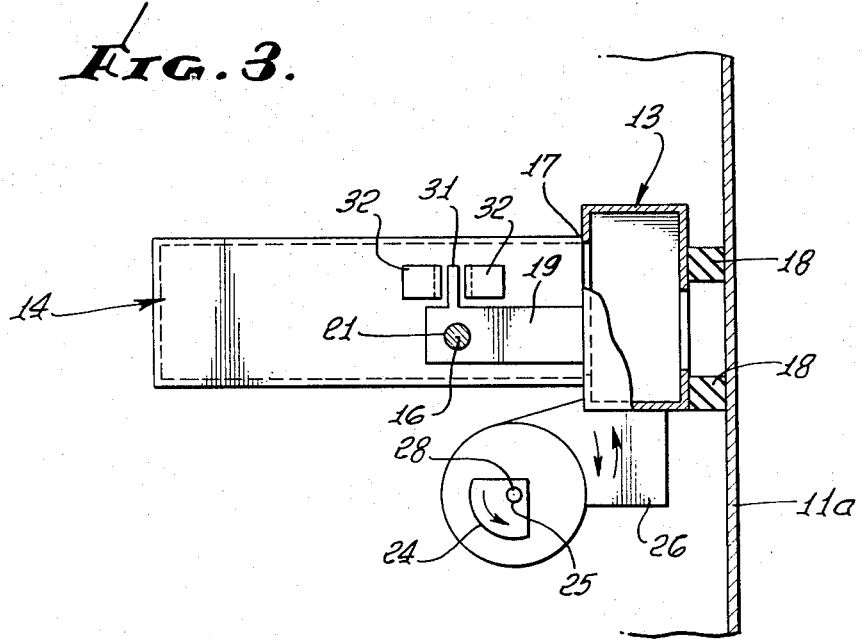
FIG. 3 is a fragmentary side elevation showing details of the filter shaking mechanism.

Means is provided to support the filter structure for movement along a predetermined path and relative to chamber or hopper 11, walls thereof appearing at 11a and 11b. In the unusually advantageous form of the invention illustrated in FIGS. 2 and 3, the support means defines a horizontal axis 16 about which the filter structure is angularly reciprocated within a limited range. Such support means includes the manifold 13 to which the filter structure has attachment at 17, the manifold in turn being resiliently connected as by rubber blocks 18 interposed between and connected with the manifold and chamber wall 11a.

The support means may also advantageously include an arm 19 connected with the manifold at one end thereof and projecting away from wall 11a and within chamber interior, a stub shaft 21 being carried by the arm and projecting to define axis 16. Self centering bearing structure 22 at wall 11b supports the stub shaft for rotation about axis 16. A similar arm 19, shaft 21 and bearing 22 may extend at the opposite end of the manifold.

Further in accordance with the invention, drive means is operable to effect repeated movement of the filter structure along the predetermined path referred to. That path may for example extend in a generally vertical plane, i.e., about axis 16. Such drive means may with unusual advantage comprise a rotatably driven eccentric mass 24 carried for rotation on shaft 25, which is in turn carried by rigid arm 26 connected with the manifold and projecting within the hopper interior and below filter level. A motor to rotate the shaft is indicated at 27, the axis 28 of motor, shaft and eccentric mass rotation being parallel to but spaced from axis 16.

Means is also provided to develop jarring force in response to filter structure movement, for repeatedly shaking the filter structure to loosen dirt accumulation. In the unusually advantageous embodiment illustrated, such means may include rigid arm structure 19 and 31 carried by the manifold to angularly reciprocate with same, together with a stop or stops 32 located in the path of arm structure movement to receive arm impact and thereby limit arm angular reciprocation about axis 16. Stops 32 may be rigidly connected with sweeper structure such as wall 11b. Each time the arm 31 strikes a stop pad 32, jarring force is transmitted to the filter structure, tending to loosen dirt accumulated on the exterior thereof.

In accordance with a further feature of the invention, the motor 27 may comprise an hydraulic unit operated only when hopper door 40 is closed, thereby eliminating need for a separate valve to control hydraulic pressure flow to the motor. FIG. 4 shows a usual valve 42 controlling hydraulic pressure delivery from pump 43 to door actuator 44, via lines 45, and one or the other of lines 46 and 47. When the valve spool is fully displaced in the door OPEN direction, fluid flows through port 48 to line 46 and cylinder space 49. As a result, piston 50 and rod 51 are urged to the right to open the door, fluid in chamber 52 returning to the reservoir 54 via line 47, port 53 and line 55. Return spring 56 then urges the spool to neutral position as shown, and the door remains open.

Thereafter, when the valve spool is fully displaced in door CLOSED direction, pressure fluid flows through port 57 to line 47 and cylinder space 52. As a result, piston 50 and rod 51 are urged to the left to close the door, and fluid in chamber 49 returns to the reservoir via port 58. When the piston bottoms out, hydraulic pressure in line 47 builds up and opens relief (check) valve 59, allowing fluid to pass to the shaker motor 27. This causes the shaker mechanism to operate and clean the filters, exhaust fluid returning to the reservoir via line 60. A by-pass 61 around the motor allows some fluid to flow through the motor when the relief valve 59 shuts off main flow and the motor continues to rotate due to inertia. This eliminates cavitation in the motor.

I claim:

1. In a street sweeper having a dirt receiving chamber having side walls, a manifold in said chamber, an air filter projecting generally horizontally and in cantilever fashion from said manifold, a suction blower connected to the manifold, means for mounting said filter in said chamber for vibratory motion, and a vibrator for vibrating said filter; the improvement wherein said means for mounting said filter for vibratory motion comprises arm means connected to said manifold, pivot means connected to said arm means including a rotatable shaft for mounting to a dirt chamber side wall so as to accommodate oscillation of said manifold about a generally horizontal axis, said vibrator being connected directly to said manifold and being disposed at a position offset from said pivot means operation of said vibrator oscillating said manifold and the projecting filter about the axis of said pivot means.

2. The street sweeper of claim 1, comprising flexible means connected between said manifold and a chamber sidewall for resiliently supporting the manifold on said sidewall.

3. The street sweeper of claim 1 wherein said dirt chamber has a door and an actuator for opening and closing the door; the improvement comprising a control system for operating said actuator, and means in said control system connected to said vibrator for operating the vibrator when said actuator has closed said chamber door, and for disabling the vibrator when said actuator opens said door.

4. The street sweeper of claim 1, wherein said manifold mounting means also comprises an arm projecting from said manifold and said pivot means comprises a pivot shaft between the distal end of said arm and the associated dirt chamber sidewall.

5. The street sweeper of claim 4 comprising closely spaced rigid stop members on one chamber side wall, and means on said arm for alternately engaging each of said stop members for limiting oscillation of said arm about said pivot shaft in both directions.

* * * * *